United States Patent [19]

Dorsey

[11] Patent Number: 5,095,519
[45] Date of Patent: Mar. 10, 1992

[54] APPARATUS AND METHOD FOR PRODUCING AN IN-LINE OPTICAL FIBER ATTENUATOR

[75] Inventor: Carl S. Dorsey, Bethlehem Township, Northampton County, Pa.

[73] Assignee: AT&T Bell Laboratories, Murray Hill, N.J.

[21] Appl. No.: 621,494

[22] Filed: Nov. 30, 1990

[51] Int. Cl.$^5$ .................. G02B 6/26; C03B 23/20; B23B 5/22
[52] U.S. Cl. ........................ 385/140; 385/96; 385/98; 385/137; 65/4.1; 65/4.2; 65/36; 279/10 C
[58] Field of Search ............... 350/96.15, 96.18, 96.20, 350/96.21, 96.29, 96.30, 320; 279/10 C; 65/4.1, 4.2, 36, 56

[56] References Cited

U.S. PATENT DOCUMENTS

| | | | |
|---|---|---|---|
| 4,557,556 | 12/1985 | Decker, Jr. | 350/96.21 |
| 4,728,170 | 3/1988 | Robertson | 350/96.15 |
| 4,971,418 | 11/1990 | Dorsey et al. | 350/96.21 |
| 4,986,627 | 1/1991 | Boscher et al. | 350/96.21 |

FOREIGN PATENT DOCUMENTS 60-176003  9/1985  Japan ..................... 350/96.20 X Primary Examiner—Brian Healy
Attorney, Agent, or Firm—Charles Graves

[57] ABSTRACT

Signal strength in an optical fiber transmission path is attenuated in one direction to a desired lower level by incorporating a selected length of coreless, undoped fiber of the same diameter into the signal-carrying fiber. On encountering the insert, the beam diameter expands to a pre-selected value at the far end of the insert. The ratio of the beam diameter at this point to the diameter of the adjacent fiber end establishes the attenuation factor. Steps are taught for achieving high consistency in both structural strength of the attenuator as well as the attenuation factor.

3 Claims, 5 Drawing Sheets

APPARATUS AND METHOD FOR PRODUCING AN IN-LINE OPTICAL FIBER ATTENUATOR

GOVERNMENT CONTRACT

The government has rights in this invention pursuant to Contract No. N00039-89-C-0083 awarded by the Department of the Navy.

FIELD OF THE INVENTION

This invention relates to optical fiber splices; and more particularly to an in-line optical fiber attenuator.

BACKGROUND OF THE INVENTION

Optical fiber attenuators are well-known in the prior art. An example taught in U.S. Pat. No. 4,557,556 issued Dec. 10, 1985, relies on offsetting the core axes of two fibers and then fusing the ends. It is also old to couple a multi-mode optical fiber to a short length of fiber which strongly attenuates certain mode groups without attenuating other mode groups of differing orders. These and other teachings of the prior art notwithstanding, there is a need presently for achieving in an optical fiber transmission path attenuation of a precise and predetermined value, which will remain constant for a substantial time despite temperature and other environmental forces. One application of such an optical fiber attenuator is where the optical power in the path must be kept within the sensitivity limits of multiplexer/repeaters present in the path. More generally, the need exists for such a splice in an in-line configuration, achievable by methods able to be practiced successfully by routine technicians.

OBJECTS OF THE INVENTION

One object of the invention is to provide an in-line optical fiber splice for which the attenuation factor can be consistently and reliably achieved with a margin of error equal to or less than that found in current attenuator fabrication processes.

Another object of the invention is to create with one standard and simple methodology optical fiber attenuators having any selected attenuation value.

A further object of the invention is to produce optical fiber transmission line attenuation without compromising the structural strength of the line.

SUMMARY OF THE INVENTION

In accordance with the invention, attenuation of a signal present in an optical fiber transmission path is achieved by fusion splicing of a selected length or segment of silica fiber into the transmission path. The segment advantageously, although not necessarily, may consist of coreless, undoped fiber of the same diameter. On encountering the insert, the beam diameter expands to a pre-selected value at the far end of the insert. The ratio of the beam diameter at this point to the diameter of the adjacent fiber end establishes the attenuation factor.

The process for realizing the preceding structure advantageously comprises fusion splicing a first singlemode optical fiber to the attenuator segment, then cleaving the segment at a precise distance from the first fusion bond, and thereafter fusion splicing the second singlemode fiber to the cleaved end.

By careful attention to quality checkpoints relating to cleave angle in the procedure, fully disclosed below, and by use of materials which promote cleanliness, high consistency in both structural strength of the attenuator as well as the attenuation factor are achieved.

The invention and its further objects, features and advantages will be fully appreciated from a reading of the detailed description of illustrative embodiments set forth below and from a study of the Drawing.

DETAILED DESCRIPTION OF ILLUSTRATIVE EMBODIMENT

The overall process for achieving the attenuator of the present invention will first be generally described.

Figure 1:
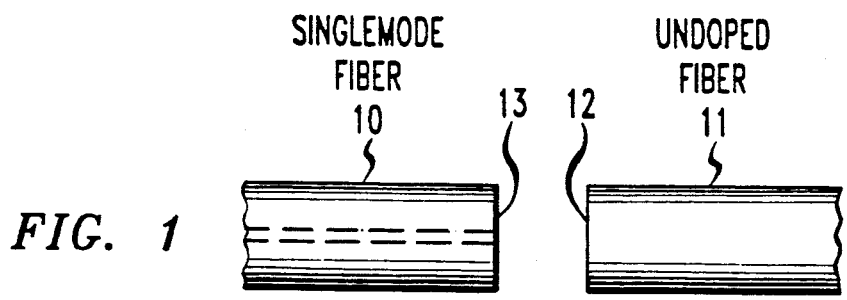
FIG. 1 is a schematic side perspective view of a fiber and a length of undoped optical fiber of the same diameter from which the attenuation segment will be fashioned.

As seen in FIG. 1, a singlemode fiber denoted 10 is aligned with a coreless, undoped fiber segment 11 of the same diameter and of an as-yet indeterminate length. The near end 12 of the segment 11 is cleaved to present a suitable optical surface for a low-loss fusion splice.

Figure 2:
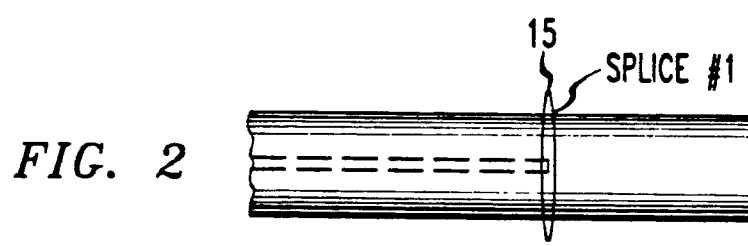
FIG. 2 is a schematic side perspective view showing the elements of FIG. 1 fused.
Figure 3:
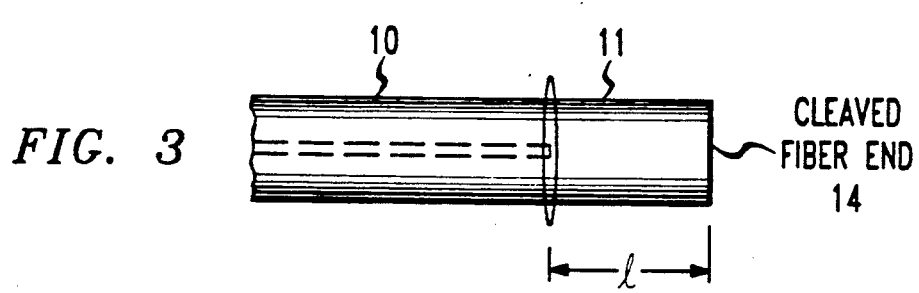
FIG. 3 is a schematic side perspective view showing the attenuation section formed to a length "l" by cleaving.

A fusion splice of the segment end 12 to the fiber end 13 then is effected, to produce the structure seen in FIG. 2. The far end 14 of the segment 11 then is cleaved at a precise distance denoted "1" from the centerzone 15 of the first fusion splice, to create an optical surface at the end 14. This intermediary structure is seen in FIG. 3.

Figure 4:
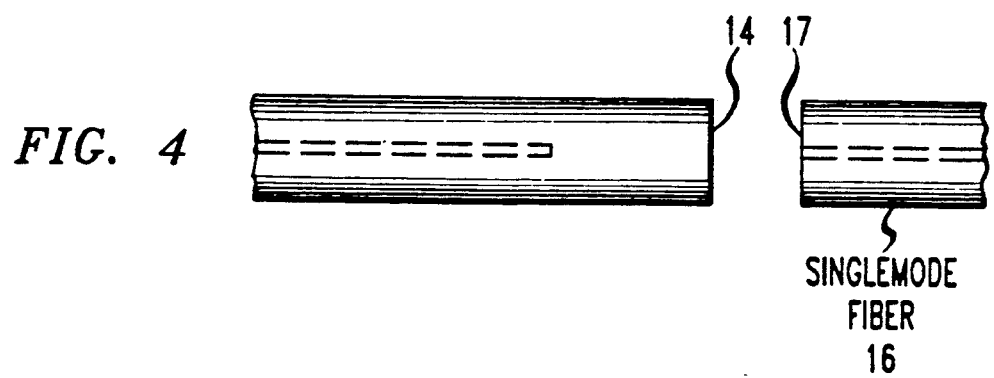
FIG. 4 is a schematic side perspective view showing the formed element of FIG. 3 and a second fiber of the same diameter in preparation for fusion.
Figure 5:
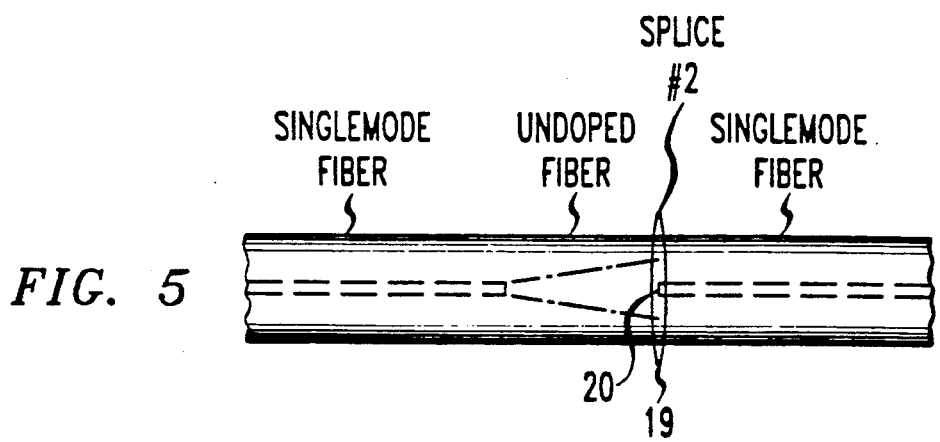
FIG. 5 is a schematic side perspective view showing installation of the completed in-line attenuator.

A second singlemode optical fiber 16 with its end 17 pre-cleaved is then aligned with the end 14 of the segment 11 as seen in FIG. 4, and fusion spliced to the end 14 as seen in FIG. 5. The optical beam 18 emerging from the singlemode fiber 10 spreads by a controlled amount in the undoped segment 11, as illustrated in FIG. 5.

Figure 6:
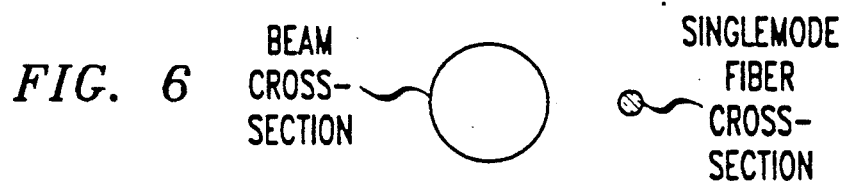
FIG. 6 is a diagram depicting the relative areas and diameters of the circular cross-sections of the divergent beam and the core of the second fiber.

To a first approximation, the attenuation occurring as a result of the arrival of only a fraction of the energy of the spreading beam 18 impinging on the end 18, is the ratio of the area of the beam cross-section at the centerzone 19 of the second splice to the cross-section area of the core 20 of fiber 16. This simplistic statement is illustrated in FIG. 6. However, as the beam 18 traverses the undoped silica of the segment 11, any of three processes which affect attenuation can occur-absorption, scattering and divergence. For a clearer understanding of the importance of controlling certain processing stages to be described later, these phenomena will next be discussed.

ABSORPTION

During the absorption process the electromagnetic energy is turned into thermal energy via atomic absorption by the silica. The change in the beam intensity due to this process obeys the following relation:

$$I = I_o e^{-\alpha z}$$

where:
- $I_o$ = the initial beam intensity
- $\alpha$ = the absorption coefficient of silica at the operating wavelength
- $z$ = the distance that the beam traverses in the material
- $I$ = the beam intensity at a distance z in the material Since the input and output cross sectional areas are equal, this relationship can be written in terms of optical power. The relationship can be further reduced to yield the following expression:

$$\text{Attenuation} = -3.57\ \alpha z (dB)$$

The absorption coefficient of fused silica at 1.31 microns is 0.00000014/cm. This would result in an attenuation due to absorption in a 55 mil silica attenuator of much less than 0.001 dB for example. Therefore, absorption losses can be considered negligible. Selection of an attenuator material with a large absorption coefficient would permit significant absorption losses.

SCATTERING

The second loss mechanism in the fiber attenuator is that which is due to scattering of the electromagnetic beam from inhomogeneities in the silica attenuator. In this case, the electromagnetic energy contained in the beam is not converted to heat. The beam is merely redirected as it contacts the impurity. This causes a reduction in the beam intensity. A relation similar to the previous expression can be derived for the losses due to scattering provided the defects are uniformly distributed within the silica fiber. In this case the absorption coefficient would be replaced with the scattering coefficient of the silica. The scattering coefficient of silica at 1.31 um is 0.00000062 per centimeter. This too will result in a negligible loss. Selection of an attenuator material with a large scattering coefficient would permit significant scattering losses.

DIVERGENCE

Figure 7:
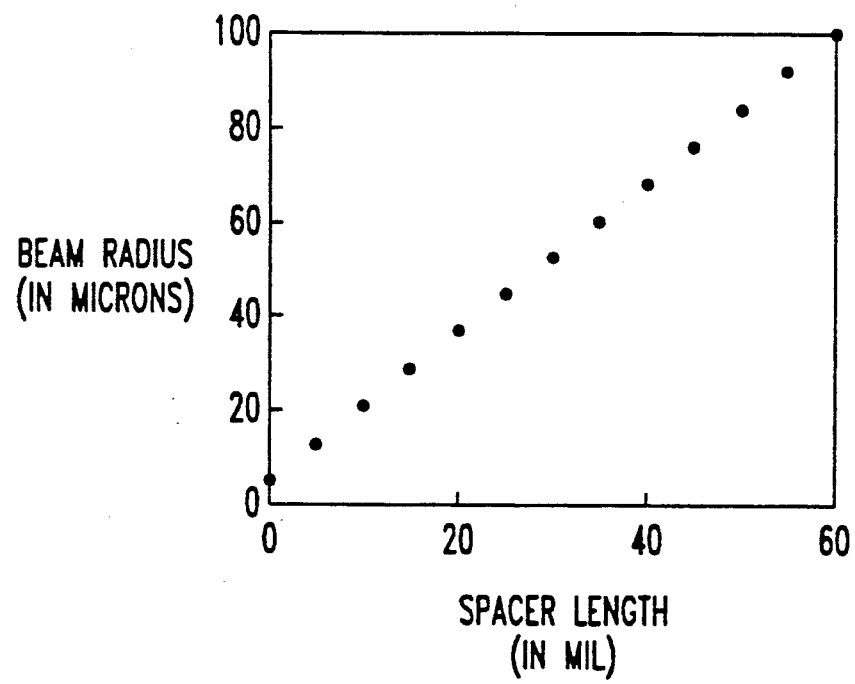
FIGS. 7, 8 and 9 are graphs depicting beam radius and theoretical and experimental attenuator loss as a function of segment (spacer) length.

The divergence of the beam is the major contributor to the attenuation by the silica. Since the silica is undoped, there is effectively no core in the attenuator. Therefore the beam is unguided as it traverses the silica. As the beam impinges on the surface of the silica it is free to expand symmetrically about the axis of the core. As the beam expands, the intensity drops. Therefore the amount of light actually coupled into the receiving fiber core is reduced. The mode field radius (MFR) (beam radius at 1/e squared of the maximum power) changes as a function of z in accordance with the following relation:

$$W^2(z) = W_o^2 \left(1 + \frac{z^2}{z_R^2}\right)$$

$$z_R = K_g \frac{W_o^2}{2}$$

and $$K_g = \frac{2\pi n_o}{\lambda}$$

where:
- $W(z)$ = the mode field radius at a point z in the material
- $W_o$ = the initial mode field radius
- $z$ = the distance at which W is being measured
- $z_R$ = the Rayleigh range of the beam
- $K_g$ = the wave number in the silica
- $n_o$ = the index of refraction of the silica
- $\lambda$ = the operating wavelength A plot of the MFR as a function of z is shown in FIG. 7 for values from 0–60 mil. The expansion is linear for z much greater than the Rayleigh range (67 um).

The free expansion of the beam is the only significant loss mechanism identified thus far. Excluding losses due to angular and MFR mismatch, the loss due to the attenuator can be derived from the expression for splice loss due to longitudinal offset. However, the index of refraction of the silica must be substituted for that of air in the formula. Therefore the attenuation of the silica obeys the following relation:

$$\text{Loss}_z = -10 \log \left( \frac{1}{1 + \left(\frac{z}{K_g W^2}\right)^2} \right) + \text{Loss}_{gap}(dB)$$

where $$\text{Loss}_{gap} = -10 \log \frac{16 n_{co}^2 n_o^2}{(n_{co} + n_o)^4}$$

The loss due to the two interfaces is small enough to be neglected. This is primarily due to the small difference in the indices of refraction of the core and the silica. The attenuator loss due to beam divergence is plotted in FIG. 3 for lengths of 0 to 55 mil.

APPLICATION

Figure 10:
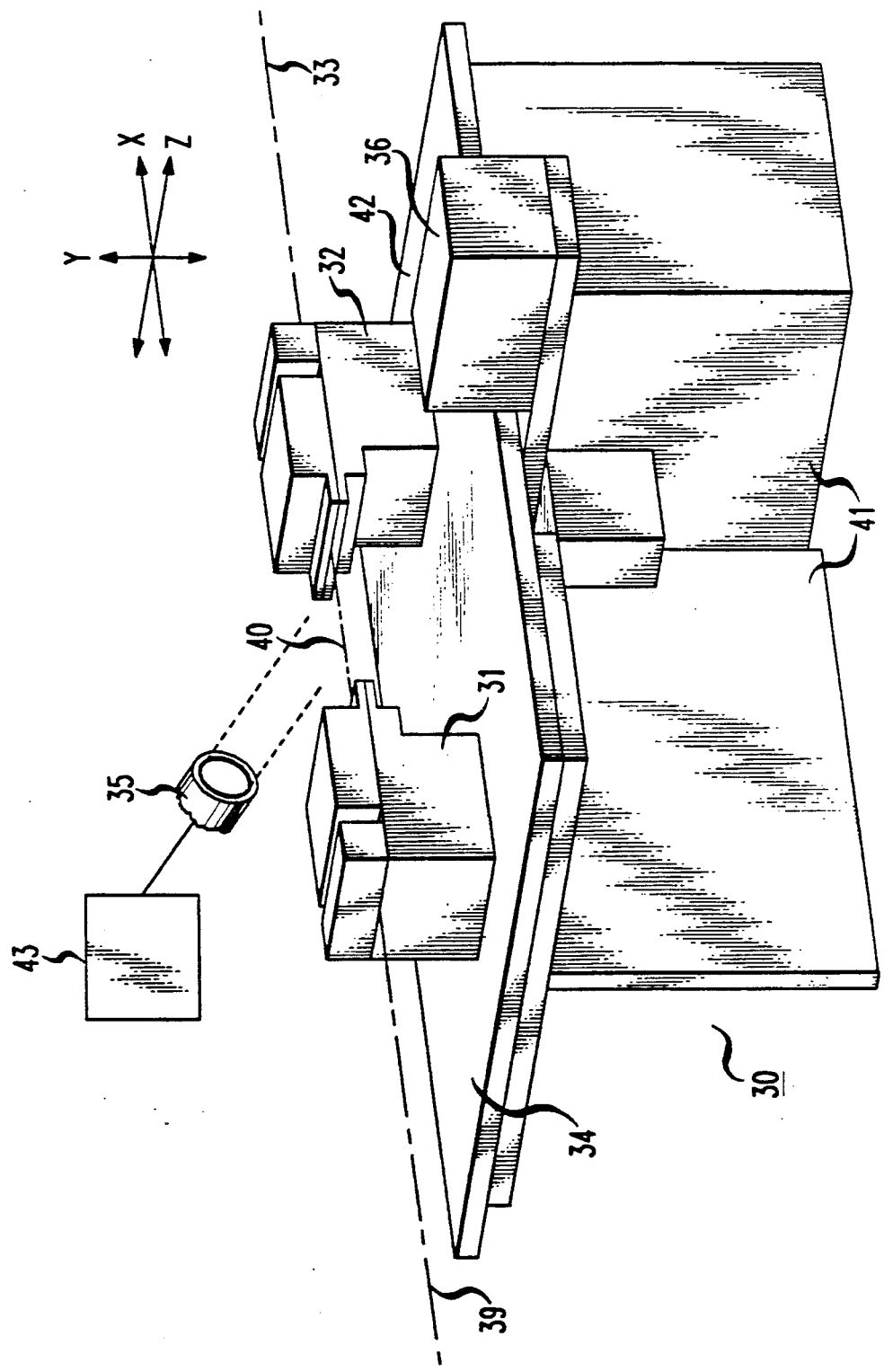
FIG. 10 is an isometric sketch of a splice station for practicing the invention.
Figure 11:
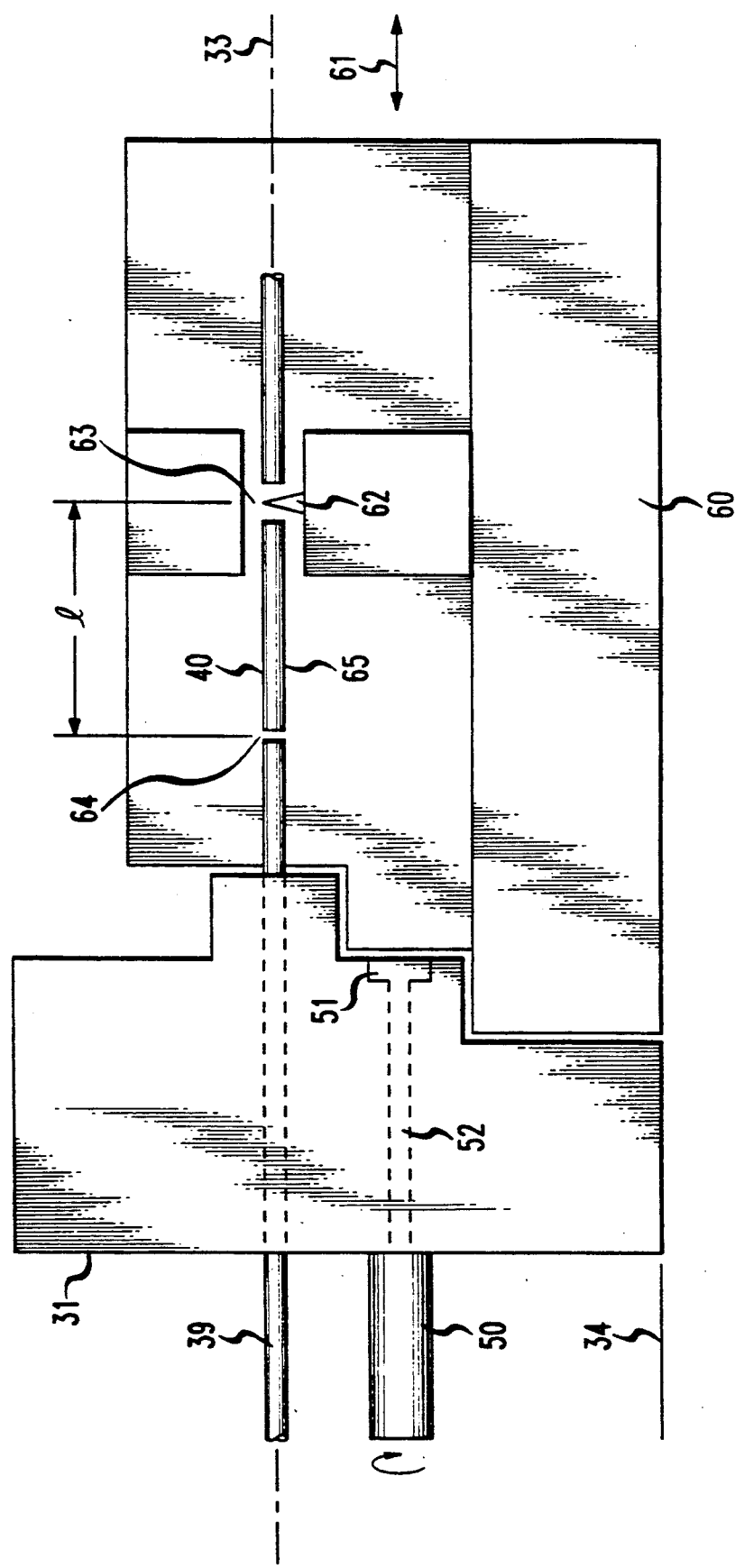
FIG. 11 is a schematic diagram of cleaving apparatus.

Installation of the in-line attenuator in accordance with the invention advantageously may be achieved at a splicing station, an example of which is shown in FIGS. 10 and 11. Here, the conventional steps of stripping, cleaving, fusion and recoating are effected. The process can be adapted to be used with any of the current fusion techniques including flame, filament or laser fusion. Importantly, the splice station includes a capability to effect a cleave at a cross-section along the fiber-attenuator axis which is a predetermined distance from a reference point at one of the chucks. This capability enables the attenuator section of fiber to be made to an exact length precisely related to the desired value of attenuation.

The station, denoted 30, includes a stationary fiber-gripping chuck 31 having a fiber-containing groove. A movable fiber-gripping chuck 32 also having a fiber-containing groove is disposed adjacent to chuck 31. Both chucks are mounted on respective platforms 34, 42 which in turn are supported on the station stand 41. The fiber-containing grooves of the chucks 31, 32 are arranged to be disposed along a common optical axis 33. Alignment controls (not shown) provide adjustment of movable chuck 32 in the X, Y, and Z-directions respectively using conventional 3-dimensional positioning techniques.

Advantageously, a video camera 35 focusable orthogonal to the axis 33, and an LED source 36 trained colinear with the camera, provide a means for observing the progress and precision of the alignment on video monitor 43.

An optical fiber 39 is inserted into the groove of chuck 31 in preparation for an attenuator section to be connected to its end. The fiber coating is stripped from the fiber; and the fiber is cleaned in isopropyl alcohol, using an ultrasonic cleaning tool (not shown).

Undoped optical fiber from which the attenuator segment will be fabricated, is loaded into the groove of the movable chuck 32. Its end is stripped, cleaned, and cleaved.

The end of the transmitting optical fiber in fixed chuck 31 likewise is cleaved. Next, the cleaved end of this fiber is aligned with respect to the undoped segment, using the alignment controls and the video monitoring apparatus. The desired fiber alignment accuracy is to within 1 micron. In this alignment position, the fiber end and the segment end are brought into light abutment, as depicted in FIG. 10, and thereafter fused.

Figure 8:
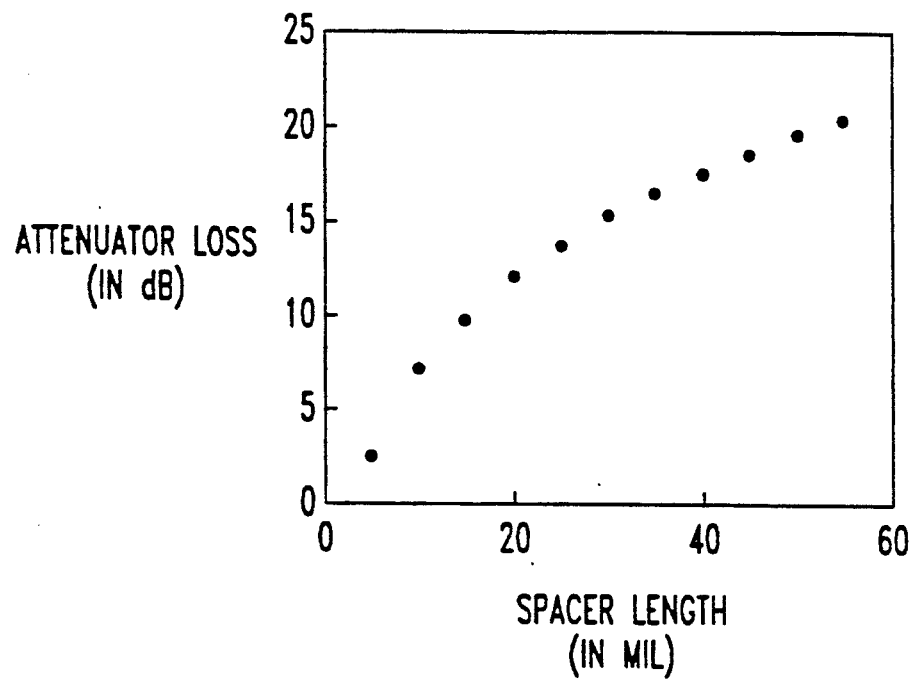

Next, information such as contained in FIGS. 7 and 8 showing attenuation as a function of segment length is consulted to determine how long the segment should be. The cleave length then is set as a distance from a reference point. Referring now to FIG. 11, the fixed chuck 31 is shown as including a micrometer 50 which is connected to a plate 51 by shaft 52. The cleaving unit, denoted 60 is movable on surface 34 in the direction denoted 61, thereby allowing an associated cleaving knife 62 and anvil 63 to be positioned along the optical axis 33. The fusion splice, denoted 64, connecting the transmitting fiber 39 and the undoped fiber material 40, is the plane with reference to which the cleaving knife 62 is positioned. In the example depicted in FIG. 11, the predetermined distance, which sets the length of the attenuation sequent 65, is denoted "I".

To complete the installation of the in-line attenuator, the end of a second fiber is cleaned and cleaved; and the far end of the attenuator is fusion-spliced to that end on the second optical fiber, as shown in FIG. 5. The completed construction is recoated.

Figure 9:
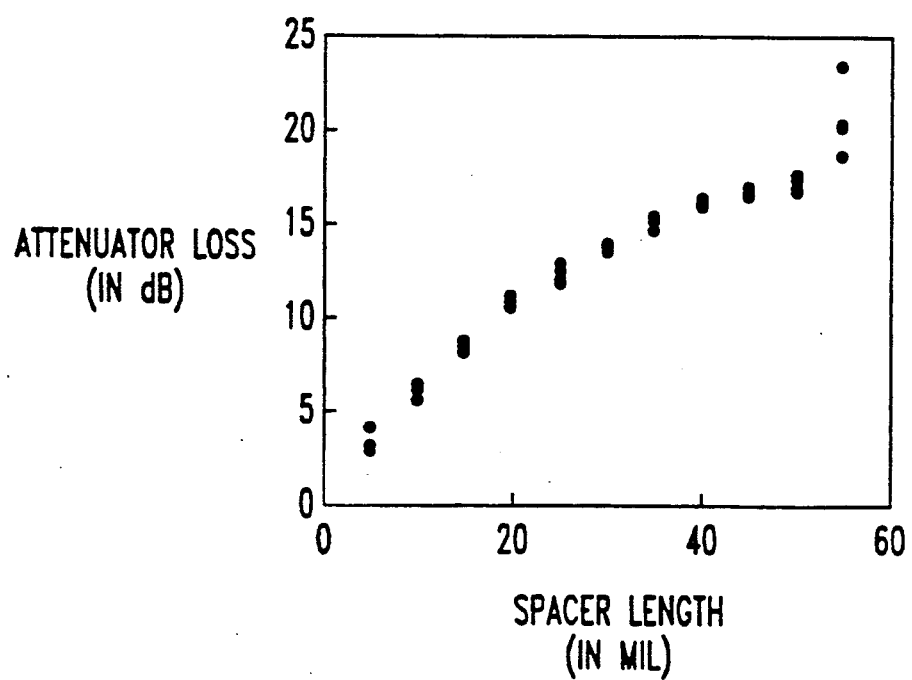

FIGS. 8 and 9 show theoretical and measured attenuator loss as a function of segment length for various lengths of the segment. The process is seen to be capable of producing closely controlled attenuation by simply controlling the length of the segment 11. Temperature response of the in-line attenuator measures generally less than 0.20 dB, over a temperature range of from +50 degrees to −45 degrees C., with the largest temperature-induced change being 0.59 dB for an 18.55 dB attenuator.

The several cleaving steps noted above may be effected with, for example, a commercial Fujikura Cleaver. As a quality check in the instant example, twelve or fewer interferometric fringes should be observable across the fiber face, thereby assuring a cleave angle of 1.5 degrees or less. There should be no abrupt changes in fringe pattern, such as a pattern that changes from three to nine fringes per half-fiber diameter. Finally, there should be no grainy appearances or rough hackles on the cleaved surface. Adherence to these conditions will assure a low-loss splice of the attenuator section to the fibers.

I claim:

1. Apparatus for producing an in-line optical fiber attenuator, comprising:
    first and second axially opposed optical fiber chucks for respectively holding and placing into axial alignment a first optical fiber and an undoped optical fiber of the same diameter;
    fiber cleaving means moveable with respect to said first fiber chuck for cleaving the facing ends of said first optical fiber and said undoped fiber;
    means for bringing said first and second chucks together thereby to place said two cleaved ends in end contact at a common plane;
    fiber fusion means for fusing said contacting cleaved ends;
    means for positioning said fiber cleaving means along said undoped length at a precise point located a predetermined distance from said common plane, and for cleaving said undoped fiber at said point thereby to produce a predetermined discrete length of undoped fiber having a precise desired attenuation value;
    means including said second fiber chuck for bringing a second optical fiber into axial alignment with said discrete length of undoped fiber, said cleaving means cleaving the end of said second optical fiber; and
    means for placing said last-named ends into contacting axial alignment and for fusing said ends in that position.

2. Apparatus in accordance with claim 1, wherein said positioning means comprises a micrometer fixedly mounted on said first optical fiber chuck and contacting said cleaving means to precisely position said cleaving means along the common axis of said first optical fiber and said length of undoped fiber.

3. A method for producing an in-line optical fiber attenuator, comprising:
    placing into axial alignment a first optical fiber and an undoped optical fiber of the same diameter;
    cleaving the facing ends of said first optical fiber and said undoped fiber;
    moving said two cleaved ends in end contact at a common plane;
    fusing said contacting cleaved ends;
    cleaving said undoped fiber at a point thereby to produce a predetermined discrete length of undoped fiber having a precise desired attenuation value;
    bringing a second optical fiber into axial alignment with said discrete length of undoped fiber and cleaving the end of said second optical fiber; and
    fusing said ends together.

* * * * *